No. 755,992. PATENTED MAR. 29, 1904.
R. F. BOWER.
ROLLER BEARING.
APPLICATION FILED AUG. 20, 1903.
NO MODEL. 3 SHEETS—SHEET 1.
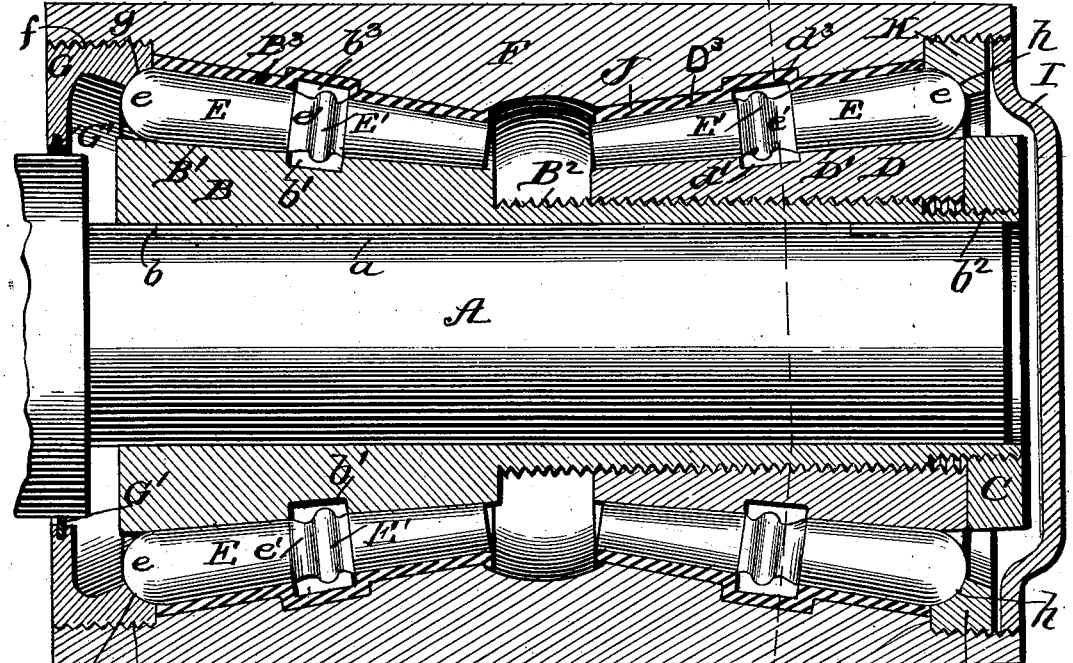
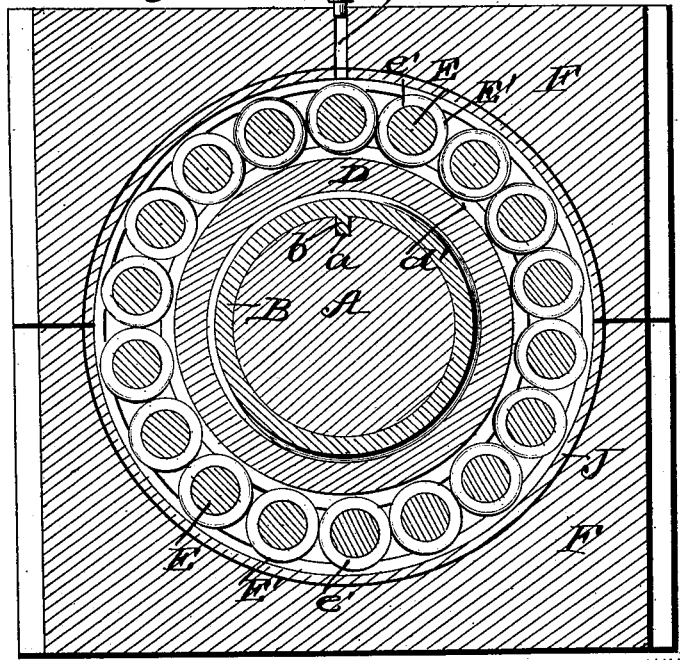
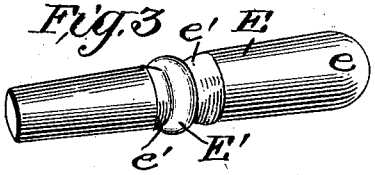
WITNESSES
INVENTOR
R. F. Bower
BY
ATTORNEYS.

No. 755,992. PATENTED MAR. 29, 1904.
R. F. BOWER.
ROLLER BEARING.
APPLICATION FILED AUG. 20, 1903.
NO MODEL. 3 SHEETS—SHEET 2.
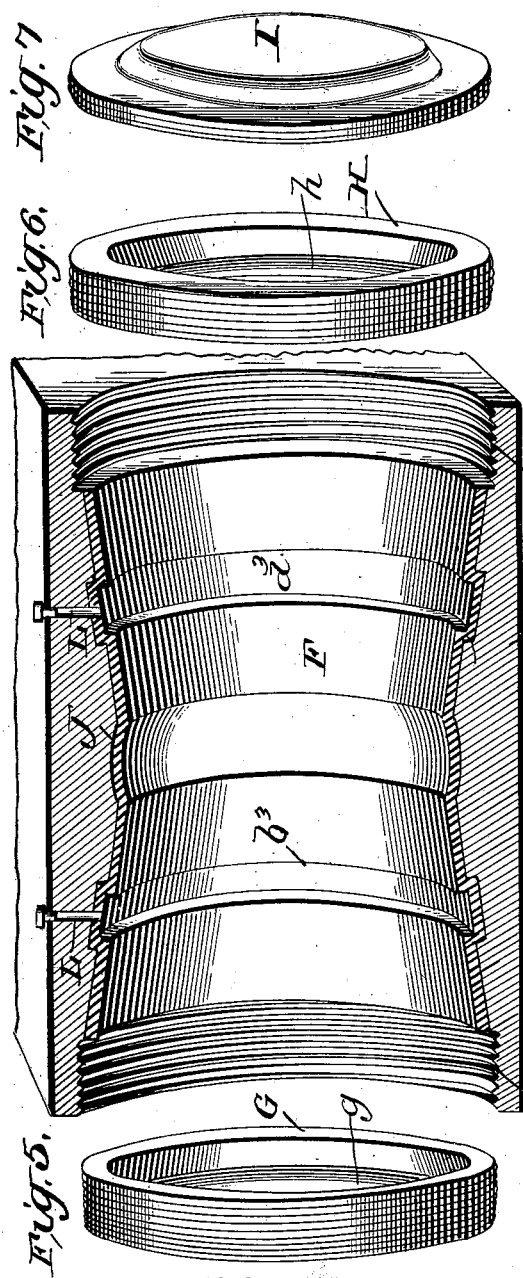
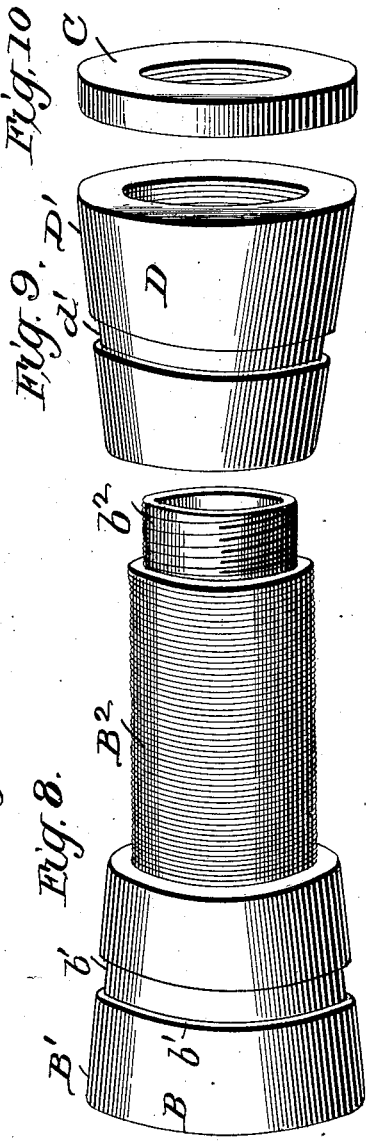
WITNESSES:
Jos. A. Ryan
Perry B. Turpin.
INVENTOR
R. F. Bower
BY Munn & Co.
ATTORNEYS.

No. 755,992. PATENTED MAR. 29, 1904.
R. F. BOWER.
ROLLER BEARING.
APPLICATION FILED AUG. 20, 1903.
NO MODEL. 3 SHEETS—SHEET 3.
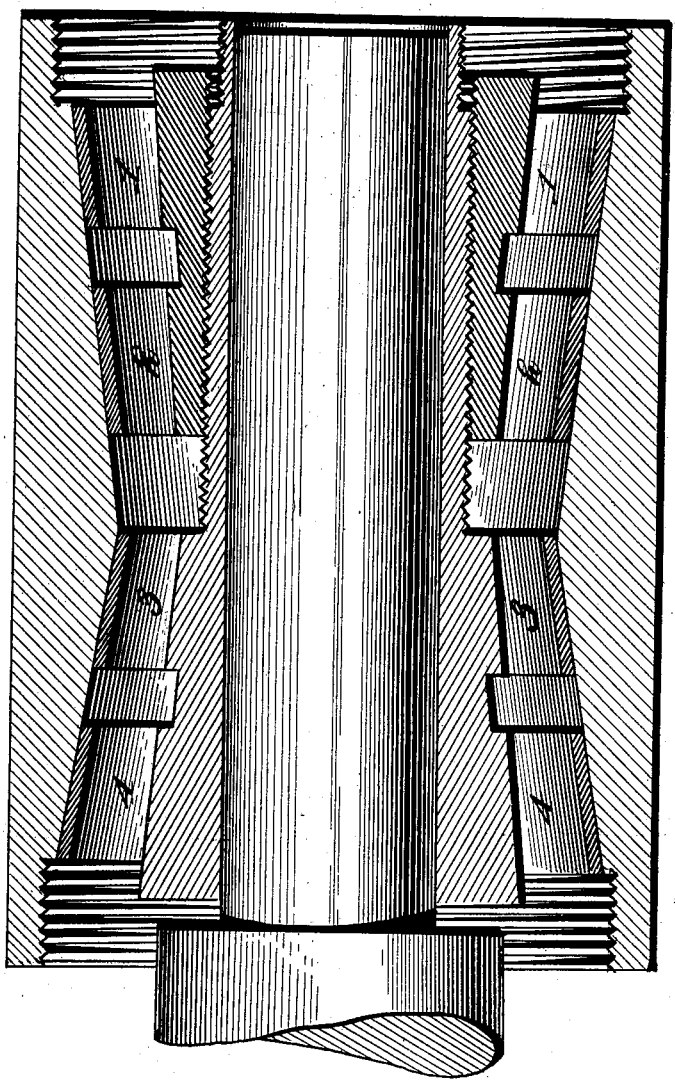
WITNESSES:
Jos. A. Ryan
Perry B. Turpin.
INVENTOR
R. F. Bower
BY Munn & Co.
ATTORNEYS No. 755,992. Patented March 29, 1904.

UNITED STATES PATENT OFFICE.

ROBERT FRANKLIN BOWER, OF LIMA, OHIO.

ROLLER-BEARING.

SPECIFICATION forming part of Letters Patent No. 755,992, dated March 29, 1904.

Application filed August 20, 1903. Serial No. 170,144. (No model.)

*To all whom it may concern:*

Be it known that I, ROBERT FRANKLIN BOWER, a citizen of the United States, and a resident of Lima, in the county of Allen and State of Ohio, have made certain new and useful Improvements in Roller-Bearings, of which the following is a specification.

My invention is an improvement in roller-bearings, and has for an object to provide a novel construction of bearing which will be useful wherever a journal-bearing is desired and will be especially useful in such bearings as are designed to permit lateral motion by allowing the shaft or journal to slide laterally in the bearing; and the invention consists in certain novel constructions and combinations of parts, as will be hereinafter described and claimed.

In the drawings, Figure 1 is a longitudinal section of a bearing embodying my invention. Fig. 2 is a cross-section on about line 2 2 of Fig. 1. Fig. 3 is a detail view of one of the rollers. Fig. 4 is a detail longitudinal section of the shell or casing. Fig. 5 is a detail perspective view of the inner end ring for the shell. Fig. 6 is a detail perspective view of the outer end ring for the shell. Fig. 7 is a detail perspective view of the cap. Fig. 8 is a detail perspective view of the inner cone. Fig. 9 is a detail perspective view of the outer cone. Fig. 10 is a detail perspective view of the jam-ring for said outer cone; and Fig. 11 is a longitudinal section of the bearing, showing the lining composed of a series of separate rings.

In carrying out my invention I construct the shaft A with a keyway $a$, in which operates the key $b$ within the bore of the inner or main cone-section B, said key $b$ holding the cone B to turn with the shaft and at the same time permitting the shaft to move longitudinally in the bearing. This key may be as shown, or may be shorter, or of any desired length.

The cone-section B is arranged at the inner end of the bearing and has its inner or main portion provided with the conical bearing-surface B', made largest at the inner end of the bearing and gradually reducing in diameter toward a point at about its middle, from which point projects the tubular threaded extension $B^2$ of the cone-section B. The bearing-surface B' of the section B is provided at about its middle with the annular groove $b'$, in which operates the flanges on the rollers. The outer section D is similar in general shape to the bearing portion B' of the section B and is threaded upon the tubular threaded extension $B^2$ at the outer end of the section B. This section D has its bearing-surface D' conical, similar to but reversed with respect to the section B, and in said surface D', at about its middle, is formed the annular groove $d'$ for the flanges on the outer series of rollers. At its extreme outer end the tubular threaded extension $B^2$ has a reduced threaded extension $b^2$, on which threads the jam or safety nut C, which abutting the outer end of the cone D operates to lock said cone-section D in any desired adjustment upon the tubular threaded extension of the cone-section B. By preference the threads on the tubular extension $B^2$ and on the reduced portion $b^2$ are reversed, one being right hand and the other left-hand, so the nut C will operate to securely lock the section D when turned thereagainst, as shown in Fig. 1. By the described construction it will be noticed I provide upon the shaft A cone-sections which can be adjusted to take up wear or for any other purpose without necessitating the provision of threads or the like upon the shaft and which will permit the shaft to move freely through the bearing to permit any desired limited longitudinal play of the shaft in the bearing, as may be desired. When used on line-shafting and the lateral movement is not desired, collars may be secured by set-screws on the shafts to prevent such lateral play or movement.

The rollers E are alike, so the description of one will answer for all. It will be noticed, however, that I dispose the rollers in two circular series, the inner series having their smaller ends arranged at the middle of the bearing and the outer series having likewise the smaller ends of the rollers arranged near the middle of the bearing and adjacent to the inner ends of the bearing-surfaces of the cone-sections. Each roller is made tapering toward one end and has its larger end rounded at $e$, so it will roll against the end ring, presently described, somewhat after the fashion of a ball. Between its ends the roller E is provided with a circular projecting flange or bead E', which operates in the groove in the bearing-surface of the cone and also in the groove of the shell and the flanges or beads E' of the adjacent rollers bear against each other, as best shown in Fig. 2, and reduce to practically the minimum the portion of the surfaces of said rollers which comes in contact. Grooves $e'$ are formed in and around the rollers on opposite sides of and immediately adjacent to the flange or bead E'. These grooves or depressions around the rollers on each side of the flanges allow the other part of the roller to wear down and still not block the adjusting-space between the cones and the shell or casing, which will now be described.

The shell or casing F may be made in one solid casting or it may be divided into upper and lower sections, as shown in Fig. 2, and this latter construction may in some instances be preferred for convenience in applying the lining of case-hardened steel to receive the bearing of the rollers and may also facilitate the fitting together of the several parts of the bearing, the sections being suitably secured by bolts or otherwise after the several parts of the bearing have been properly applied for use. As shown, the shell or casing F fits around the series of rollers and is provided in its inner end with the threads at $f$ for the inner end ring G and at its outer end with the threads $f'$ for the outer end ring H and for the cap I, as shown in Fig. 1. Between the threads $f$ and $f'$ I form the tapering surfaces $B^3$ and $D^3$ opposite, respectively, the cones B and D, and these bearing-surfaces $B^3$ and $D^3$ within the shell may be lined, as shown at J, with case-hardened steel, as best shown in Fig. 1 of the drawings, and these surfaces $B^3$ and $D^3$ are provided with annular grooves $b^3$ and $d^3$, lying opposite the grooves $b'$ and $d'$ in the cones B and D and receiving the projecting flanges E' on the rollers, as will be understood from Fig. 1 of the drawings.

In Fig. 4 the lining is in one piece, while in Fig. 1 it is shown made in separate end sections, which may be forced in tightly and become practically a part of the shell, so that the contraction and expansion will not loosen them. It will also be understood that where desired the lining may be composed of a series of rings, such as 1, 2, 3, and 4, as shown in Fig. 11.

The inner end ring G screws into the threaded socket $f$ of the shell and may be provided with a felt washer at G' to fit the shaft. The outer end ring H screws into the threaded socket $f'$ of the shell, and said rings G and H are provided at $g$ and $h$ with curved surfaces to receive the rounded ends $e$ of the rollers.

By the described flanged construction of the rollers only the flanges of the adjacent rollers contact, thus preventing the rollers from rubbing together excepting at the flanged portion, which would be practically the same in some respects as a row of balls. It will also be noticed that the grooves $e'$ on opposite sides of the flanges E' are important, as in case the rollers wear down where they bear between the surfaces B' or D' and $B^3$ or $D^3$ the part opposite the grooves in the cones and shell will not form shoulders to prevent the adjustment of the cones upon each other when it is desired to adjust the bearing.

In practice all parts of the bearing may be made of hardened steel except the outer section or body of the shell.

To place the boxing together, the cones may be placed in the outer shell, with the sections screwed together only enough to hold the rollers, which may then be dropped in one end and the end ring screwed in and the boxing reversed and the rollers filled in the other end, the cone-sections being then screwed together until the rollers all crowd to their places. The bearing may then be slid upon any shaft or axle having a groove to receive the key $a$ on the cone-section A. When the invention is applied to the middle of a shaft, the cap I may be omitted.

Manifestly, the invention may be used in car-axle boxes or line-shafts, stationary machinery, propeller-shafts, and elsewhere wherever a journal-bearing is employed.

The bearings may be made in various sizes and adapted to carry the weight imposed upon them.

Oil may be supplied through the openings L, and these openings can be closed with plugs or caps, as will be understood from the drawings.

Having thus described my invention, what I claim as new, and desire to secure by Letters Patent, is—

1. The improvement in roller-bearings herein described comprising the inner cone-section having a key, and formed with a main portion having an outer tapered bearing-surface and an annular groove in the same about midway its ends, a threaded tubular extension from the smaller end of said main portion, the outer cone-section screwed upon said threaded tubular extension and having the tapered bearing-surface and the annular groove in the same about midway its ends, the shell having tapered bearing-surfaces opposite those of the cone-sections and provided midway between the ends thereof with annular grooves opposite those in the cone-sections and provided in the ends of said shell with threaded sockets for the end rings, the end rings screwed in said sockets and having the rounded grooves for the ends of the rollers, and the rollers bearing between the tapered bearing-surfaces of the cones and shell, said rollers being tapered from their larger toward their smaller ends, having the larger ends rounded and operating in the grooves of the end rings and having at their middles the projecting flanges to operate in the grooves of the bearing-surfaces, and provided with the annular grooves on opposite sides of said flanges substantially as and for the purposes set forth.

2. In a roller-bearing a roller provided between its ends with a projecting annular flange and having annular grooves on opposite sides of said flange as set forth.

3. In a roller-bearing the herein-described roller tapered from one end to the other and provided at its middle with a projecting flange and on opposite sides thereof with annular grooves substantially as set forth.

4. The combination in a roller-bearing of the shell having the tapered bearing-surfaces, the cone-sections having the tapered bearing-surfaces opposing those of the shell, annular grooves being provided in the bearing-surfaces for the flanges of the rollers, and the rollers having flanges operating in said grooves substantially as set forth.

5. A roller-bearing comprising the shell having bearing-surfaces, the cone-sections screwed together and having bearing-surfaces opposing those of the shell, said bearing-surfaces having annular grooves, and the rollers between said bearing-surfaces, and having annular flanges and grooves alongside the same substantially as set forth.

6. The combination of the shell having screw-threads at its inner and outer ends for the end rings and provided with the tapered bearing-surfaces having the annular grooves, the cone-sections having the tapered bearing-surfaces opposite those of the shell and provided in said surfaces with the annular grooves opposite those of the shell, the rollers having flanges operating in said grooves and the end rings screwing into the shell substantially as set forth.

7. In a roller-bearing the combination of the shell, the cone-sections one of which is screwed upon the other, the jam-nut, and the rollers operating between the cone-sections and shell and having annular flanges and grooves alongside the same substantially as set forth.

8. The combination of the shell the cones, the end rings connected with the shell and having curved grooves for the ends of the rollers, and the rollers having their ends rounded and operating at the outer edges of said end in the curved grooves of the end rings, the inner edges of said ends of the rollers being unobstructed substantially as set forth.

9. The herein-described improvement in roller-bearings comprising the shell having the tapered bearing-surfaces, the cones having tapered bearing-surfaces opposing those of the shell, and the tapered rollers operating between the bearing-surfaces of the cones and shell and provided between their ends with projecting flanges substantially as set forth.

10. The combination of the opposing bearing-surfaces having annular grooves and the rollers between said surfaces and having annular flanges operating in said grooves and also provided with annular grooves alongside the said flanges substantially as set forth.

ROBERT FRANKLIN BOWER.

Witnesses:
   Wm. E. Reilly,
   Miner A. Atmur